US011878481B2

(12) United States Patent
Johnson

(10) Patent No.: US 11,878,481 B2
(45) Date of Patent: Jan. 23, 2024

(54) BEAD FORMING SYSTEM WITH DEDICATED SETUP AREA

(71) Applicant: Bartell Machinery Systems, L.L.C., Rome, NY (US)

(72) Inventor: Christopher L. Johnson, Blossvale, NY (US)

(73) Assignee: Bartell Machinery Systems, L.L.C., Rome, NY (US)

( * ) Notice: Subject to any disclaimer, the term of this patent is extended or adjusted under 35 U.S.C. 154(b) by 88 days.

(21) Appl. No.: 17/183,730

(22) Filed: Feb. 24, 2021

(65) Prior Publication Data
US 2021/0260843 A1   Aug. 26, 2021

Related U.S. Application Data

(60) Provisional application No. 62/981,221, filed on Feb. 25, 2020.

(51) Int. Cl.
 B29D 30/48 (2006.01)
(52) U.S. Cl.
 CPC ........ B29D 30/48 (2013.01); *B29D 2030/482* (2013.01); *B29D 2030/487* (2013.01)
(58) Field of Classification Search
 CPC ........ B29D 2030/487; B29D 2030/485; B29D 30/48; B29D 2030/488; B29D 2030/482; B29D 30/50
 (Continued)

(56) References Cited

U.S. PATENT DOCUMENTS 1,451,837 A * 4/1923 McClenathen ........ B29D 30/48
  156/522
1,559,127 A  10/1925 Perrault et al.
  (Continued)

FOREIGN PATENT DOCUMENTS

DE     1 007 283 B     5/1957
DE    20 2004 020 591 U1    10/2005
  (Continued)

OTHER PUBLICATIONS

International Search Report and Written Opinion received for PCT Patent Application No. PCT/US2021/019444, dated May 18, 2021, 12 pages.
  (Continued)

*Primary Examiner* — Galen H Hauth
*Assistant Examiner* — Alexander D Booth
(74) *Attorney, Agent, or Firm* — Shook, Hardy & Bacon L.L.P.

(57) ABSTRACT

A bead forming system for forming a tire bead may include the following: a housing, a first bead former configured to facilitate the formation of the tire bead, and a base secured to the first bead former, where the first bead former includes a bead-receiving surface that is rotatable relative to the base. The base may be adjustable such that the first bead former is movable from a first position to a second position. The first position may be on a first side of the housing, and the second position may be on a second side of the housing. A second bead former may be located in the second position when the first bead former is located in the first position, where the second bead former is located in the first position when the first bead former is located in the second position.

17 Claims, 9 Drawing Sheets

(58) Field of Classification Search
USPC .......................................................... 156/136
See application file for complete search history.

(56)  References Cited

U.S. PATENT DOCUMENTS

| | | | |
|---|---|---|---|
| 5,203,938 | A | 4/1993 | Moody et al. |
| 5,632,836 | A | 5/1997 | Verschoor et al. |
| 9,126,340 | B2 | 9/2015 | Gatley et al. |
| 10,365,084 | B2 | 7/2019 | Little et al. |
| 10,456,807 | B2 | 10/2019 | Russo, II et al. |
| 10,457,007 | B2 | 10/2019 | Johnson et al. |
| 10,695,998 | B2 | 6/2020 | Sassaman et al. |
| 2007/0215265 | A1* | 9/2007 | Sata .................. B29D 30/0016 156/110.1 |
| 2017/0106617 | A1 | 4/2017 | Johnson et al. |
| 2019/0001601 | A1* | 1/2019 | Van Laar ............... B29D 30/48 |
| 2019/0299554 | A1 | 10/2019 | Russo et al. |
| 2020/0094504 | A1 | 3/2020 | Russo et al. |
| 2020/0271439 | A1 | 8/2020 | Gatley et al. |

FOREIGN PATENT DOCUMENTS

| | | |
|---|---|---|
| EP | 1 552 917 A1 | 7/2005 |
| EP | 2 537 667 A1 | 12/2012 |
| WO | 2014/058303 A1 | 4/2014 |
| WO | 2014/097111 A1 | 6/2014 |
| WO | 2018/217078 A1 | 11/2018 |

OTHER PUBLICATIONS

International Preliminary Report on Patentability received for PCT Application No. PCT/US2021/019444, dated Sep. 9, 2022, 9 pages.

* cited by examiner

BEAD FORMING SYSTEM WITH DEDICATED SETUP AREA

RELATED APPLICATIONS

This application claims the benefit of U.S. Provisional Application No. 62/981,221, filed Feb. 25, 2020, which is hereby incorporated by reference in its entirety.

BACKGROUND

A vehicle tire generally has two annular bead rings at the innermost diameter, which provide the tire with hoop strength and structural integrity. The beads also provide stiffness at the point where the tire mounts to a rim. Beads are generally manufactured by winding metal wire in a groove on the outer periphery of a chuck or drum, often called a former. A bead may also be formed from a single wire.

Often, a single manufacturing facility may produce several types of beads with varying sizes and shapes. Existing equipment may not be able to form more than one type of bead, and therefore multiple machines, each associated with a specific type of bead, can be required in each of these facilities. Other equipment may be adjustable to accommodate different types of beads, but the adjustment process may be burdensome and require substantial modifications to the machinery (thereby requiring downtime). For example, the former, which is generally associated with a particular bead type, must be removed and replaced. The former is generally a heavy piece of equipment and may require a substantial amount of time to remove and replace, thereby increasing costs and production times when adjusting machinery to accommodate a different bead.

Thus, an improved bead forming system with a former having improved efficiency and ease of use may be desirable.

BRIEF DESCRIPTION OF THE DRAWINGS

The embodiments of the present disclosure may be better understood with reference to the following drawings and description. The components in the figures are not necessarily to scale, with emphasis instead being placed upon illustrating the principles of the present disclosure. Moreover, in the figures, like referenced numerals designate similar or identical features.

DETAILED DESCRIPTION

Figure 1:
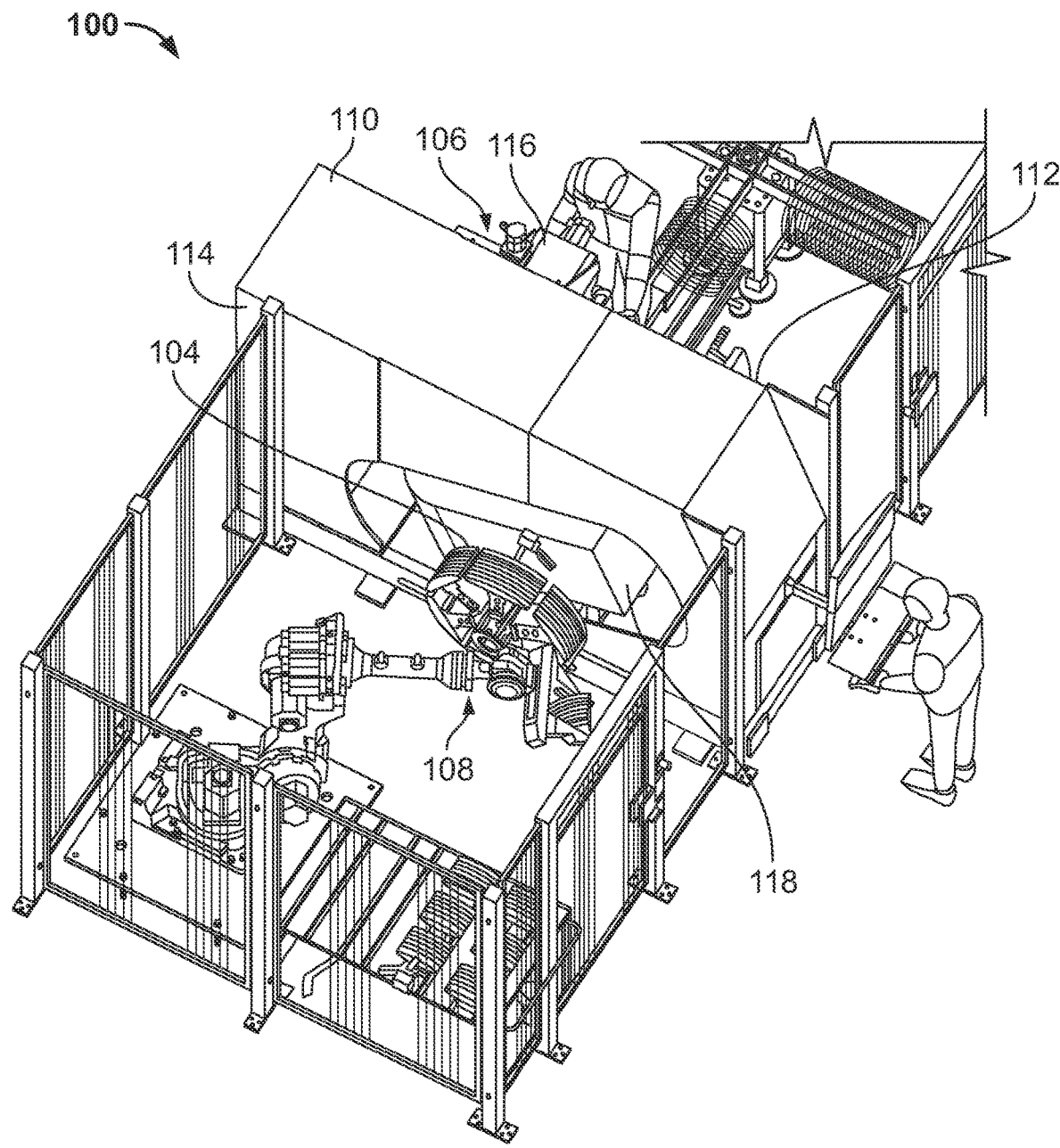
FIG. 1 is an illustration showing a perspective view of a bead forming system in accordance with certain aspects of the present disclosure.

The present embodiments are described with reference to the drawings in which like elements are referred to by like numerals. The relationship and functioning of the various elements of this invention are better understood from the following detailed description. However, the embodiments of the invention are not limited to the embodiments illustrated in the drawings. It should be understood that in certain instances, details have been omitted which are not necessary for an understanding of the present invention, such as conventional fabrication and assembly.

Notably, in addition to the features described below (and variations thereof), the systems herein may incorporate readily-available equipment and technology for the formation of annular bead ring, such as components from commercially-available products like the SWS-6000 Single Wire Bead Winding System and/or the TDS-860 Bead Winder System, each of which are manufactured by Bartell Machinery Systems, L.L.C. of Rome, N.Y. Incorporation of certain existing components may provide backwards compatibility with respect to certain mechanical parts, thereby reducing up-front cost to certain customers.

Figure 2:
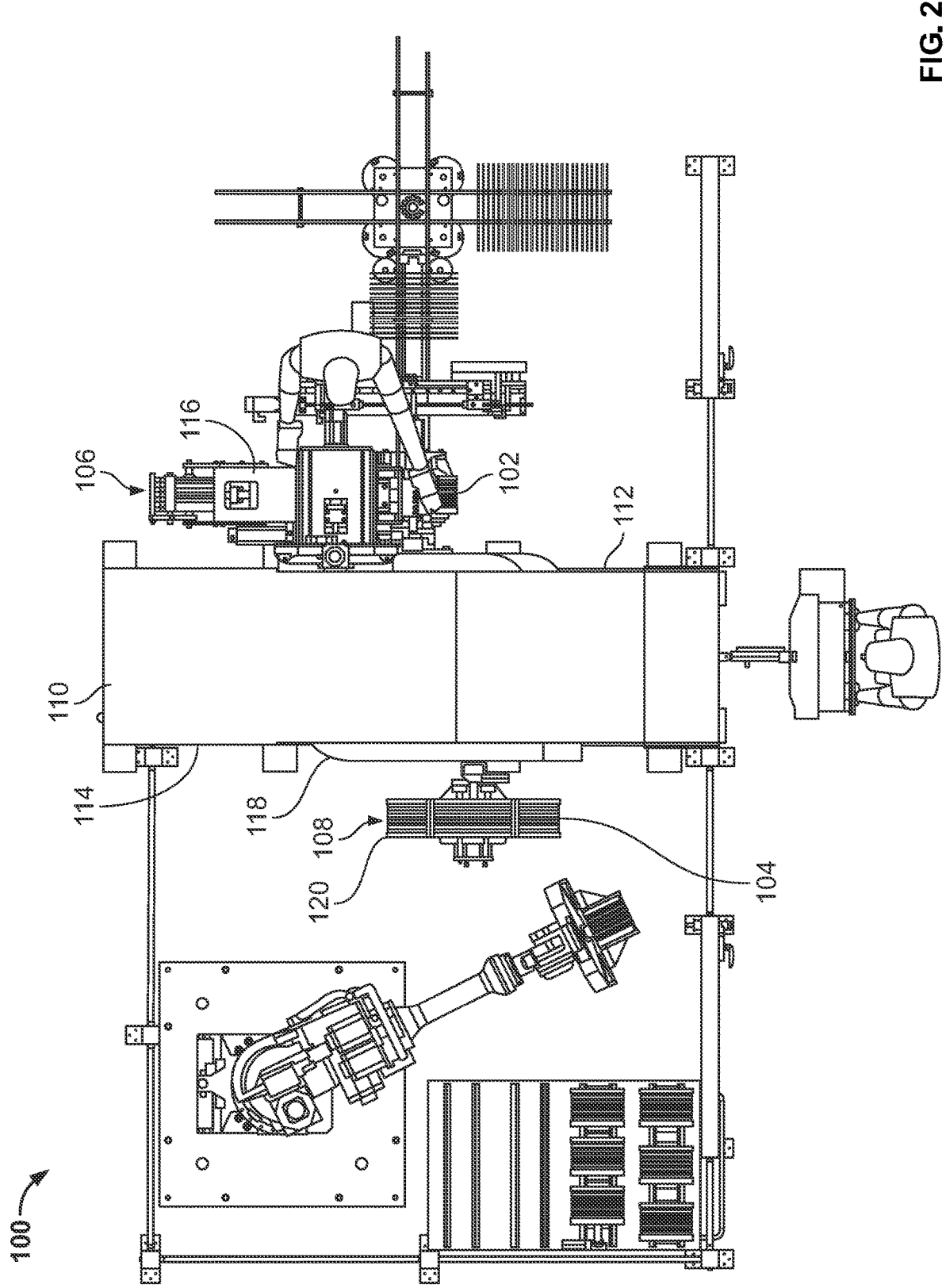
FIG. 2 is an illustration showing a top view of the bead forming system of FIG. 1.
Figure 3:
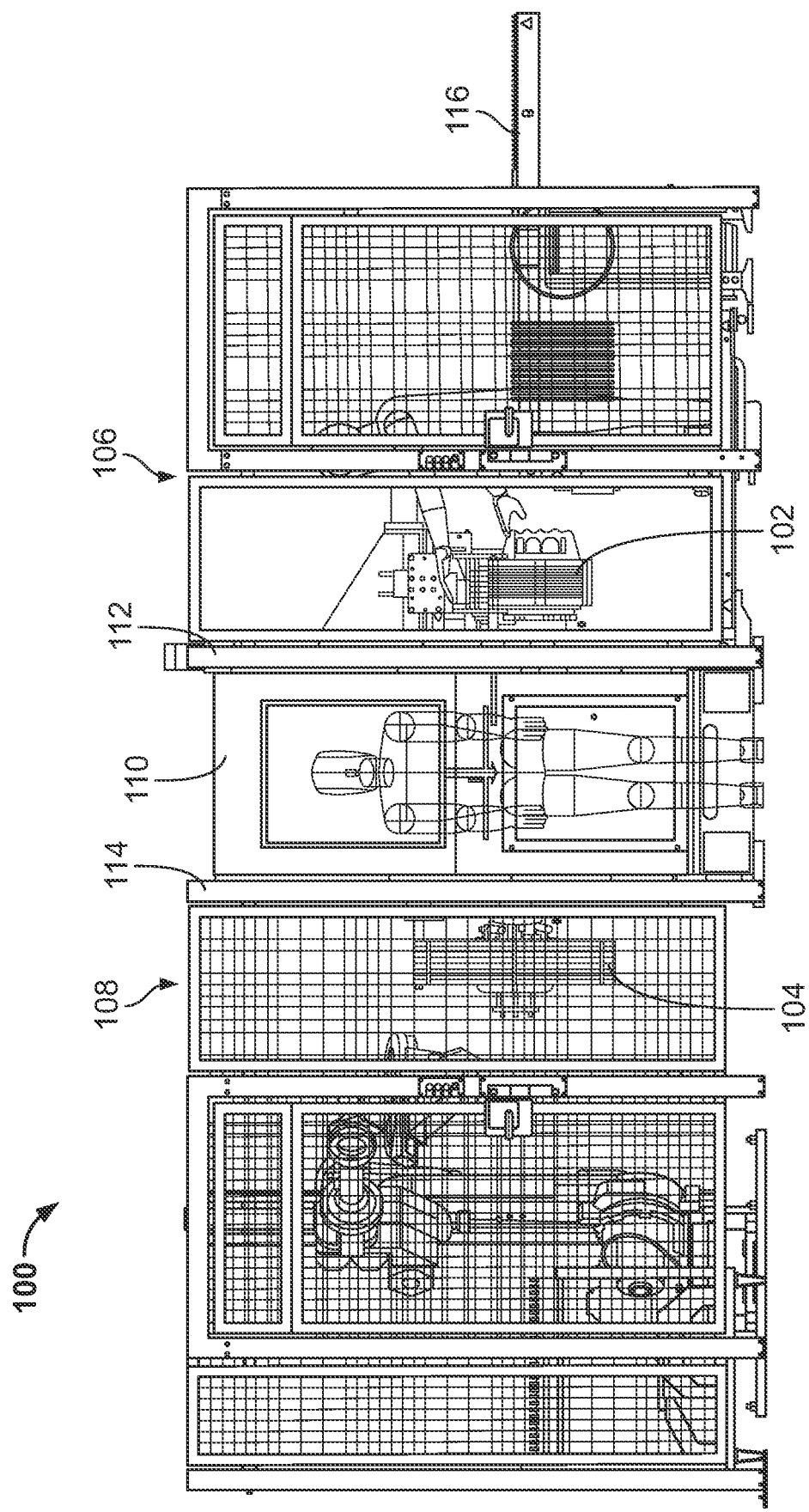
FIG. 3 is an illustration showing a front view of the bead forming system of FIG. 1.

Referring now to the figures, FIG. 1 shows a perspective view of a bead forming system 100 for forming at least one tire bead. FIG. 2 shows a top view of the bead forming system 100. FIG. 3 shows a front view of the same. The bead forming system 100 depicted in FIGS. 1-3, and variations thereof, may have the ability for producing tire beads of multiple sizes. Further, as discussed in detail below, the bead forming system 100 may be advantageously capable of rotating a first bead former 102 between an operational position and a loading or setup position. When the first bead former 102 is in the first position 106 (e.g., for bead manufacturing), the second bead former 104 may be in the second position 108, whereby the second bead former 104 may be manipulated to later manufacture a bead of a particular size. At an appropriate time, the first bead former 102 and the second bead former 104 may switch places, thereby allowing a bead of a different characteristic (e.g., a different diameter) to be formed by the associated bead winding equipment.

Such a feature is advantageous for providing a quick and efficient way for configuring the bead forming system 100 to form a bead of a different characteristic (e.g., a different size) while reducing machine downtime relative to other systems. For example, while other systems must shut down for substantial periods of time when changing bead sizes (e.g., for hours in some circumstances), the present embodiments provide a way for such setup to occur without any, or very little, machine downtime. For example, the only required machine downtime may occur when the first bead former 102 and the second bead former 104 are switching positions (which may occur in less than 15 seconds in certain exemplary embodiments). Systems with this capability may also occupy relatively little space relative to their manufacturing capacity (e.g., as less downtime increases the output of each system).

As shown in FIGS. 1-3, a housing 110 may form a substantial portion of the bead forming system 100. The housing may be formed of sheet metal, for example. In the depicted configuration, the first bead former 102 is located in a first position 106 on the first side 112 of the housing 110 and the second bead former is located in a second position 108 on the second side of the housing 110. The first position 106 may be a position where a corresponding bead former engages bead winding equipment 116. That is, when the first bead former 102 (and/or the second bead former 104) is located in the first position 106, it is located with an appropriate proximity relative to the bead winding equipment 116 such that a bead can be formed on the first bead former 102. The second position 108 may lack bead winding equipment. Instead, the second position 108 may include setup equipment (as discussed below) and/or appropriate floor space for manual setup such that a bead former in this position can be adjusted for future manufacturing of a bead with particular characteristics. Notably, the first bead former 102 and the second bead former 104 may be separately operable (e.g., operation/rotation of one does not affect the other) such that bead formation on the first bead former 102 does not affect a setup procedure on the second bead former 104, and vice versa.

A base 118 may be secured to the first bead former 102 and/or the second bead former 104. During a bead-winding operation in the depicted orientation, for example, the base 118 may remain substantially still (i.e., locked in place) while at least one tire bead is formed on a bead-receiving surface 120 of the first bead former 102. The first bead former 102 may rotate relative to the base 118 during this bead formation. Simultaneously, the second bead former 104 may be substantially still (or at least unaffected by the rotation of the first bead former 102) such that a setup process can occur.

Once a bead winding on the first bead former 102 is complete (and/or setup of the second bead former 104 is complete), the base 118 may rotate or otherwise move such that the first bead former 102 and the second bead former 104 switch places. Once switched, the second bead former 104 may be located in the first position 106 on the first side of the housing 110 (for bead formation using the second bead former 104) and the first bead former 102 may be located in the second position 108 on the second side of the housing 110 (e.g., where it may be reconfigured for forming a different bead type, if desired).

Figure 4:
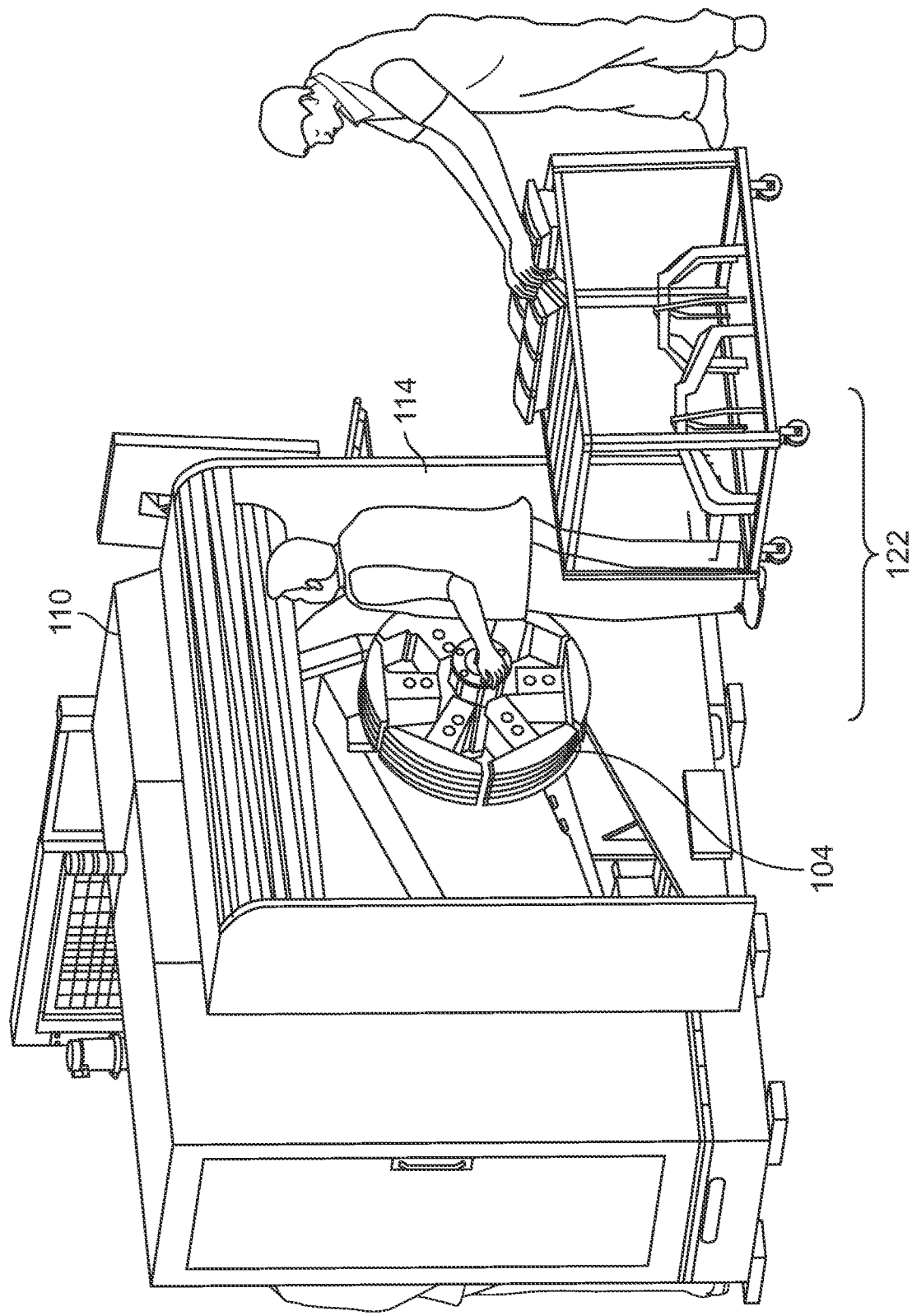
FIG. 4 is an illustration showing a perspective view of a setup side of a housing for a bead forming system providing setup space in accordance with certain aspects of the present disclosure.
Figure 5:
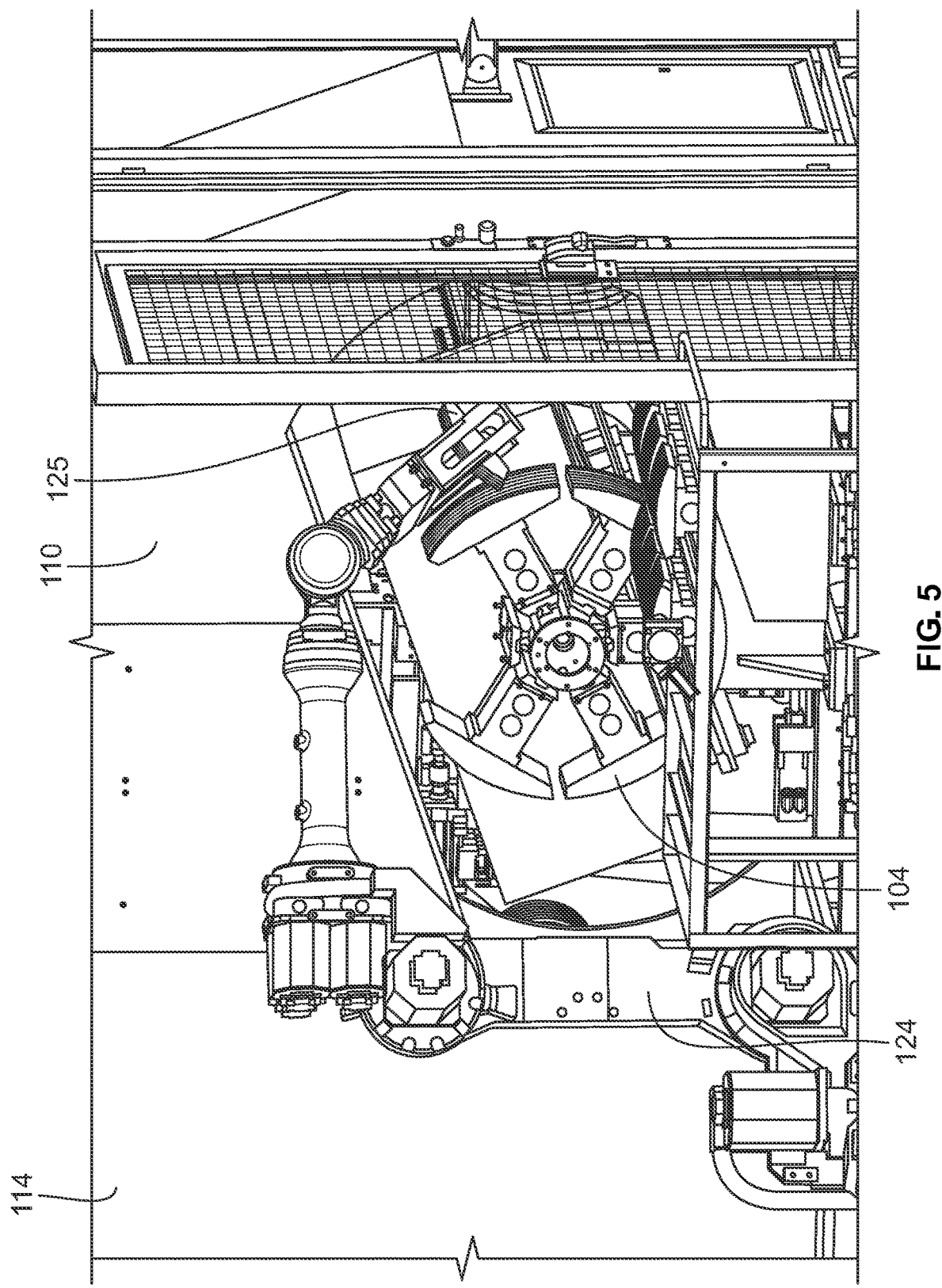
FIG. 5 is an illustration showing a side view of a setup side of a housing for a bead forming system with automated setup equipment in accordance with certain aspects of the present disclosure.

A setup area 122 may be located on the second side 114 of the housing 110. In some embodiments (such as the embodiment of FIG. 4), the setup area 122 may simply include floor space that is sufficient for retooling a bead former, which may be occupied by tools, bead former components, workstations, and/or other equipment for use by a worker with expertise in bead former setup. Additionally or alternatively, at least one robotic or other automatic retooling mechanism may be included. In the depicted example of FIG. 5, a robotic arm 124 is included. The robotic arm 124 may be configured for changing the second bead former 104 between a first bead setting and a second bead setting, where these bead settings are associated with different bead characteristics. For example, the robotic arm may change the size of the second bead former 104 (in the depicted orientation) such that, when appropriate, the second bead former 104 can be moved into the first position 106 (discussed above, see FIG. 2) ready for the immediate initiation of manufacturing a bead with desired characteristics (which may be different from a bead previously manufactured on the second bead former 104). To illustrate, the robotic arm 124 is moving a chuck portion 125 into place in FIG. 5 (which may be replacing a prior chuck portion).

Figure 6:
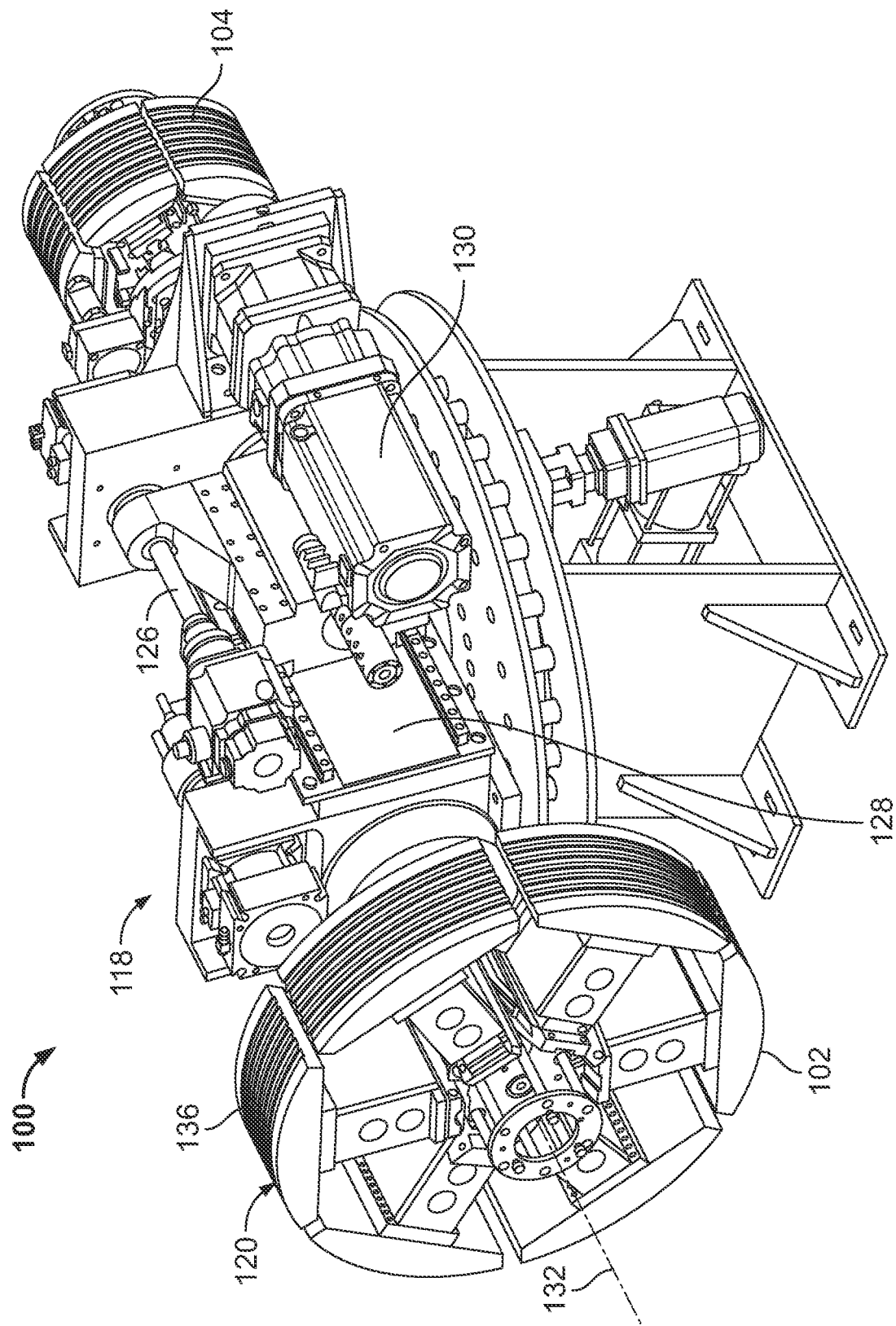
FIG. 6 is an illustration showing a perspective view of a portion of the bead forming system of FIG. 1.

FIG. 6 shows a portion of the bead forming system 100 where the housing 110 (see FIG. 1) is absent. A base housing is also absent from view in FIG. 6 such that base components 126 of the base are shown. The base 118 may include actuators for operating the first bead former 102 and the second bead former 104 (and it is noted that the second bead former 104 is shown with a smaller setup in this image). For example, a first actuator 128 may be included for rotating the first bead former 102 about a bead former axis 132. A second actuator 130 may be included for controlling the radial position of at least one bead-receiving surface 120 (with the grooves 136) of the first bead former 102 (e.g., such that the bead-receiving surface 120 may move into and out of engagement with a bead). Similar or identical actuators may be associated with the second bead former 104. Optionally, the actuators associated with the first bead former 102 and the actuators associated with the second bead former 104 may be wholly separately operable such that operation of one bead former does not affect the other (as discussed above).

Figure 7:
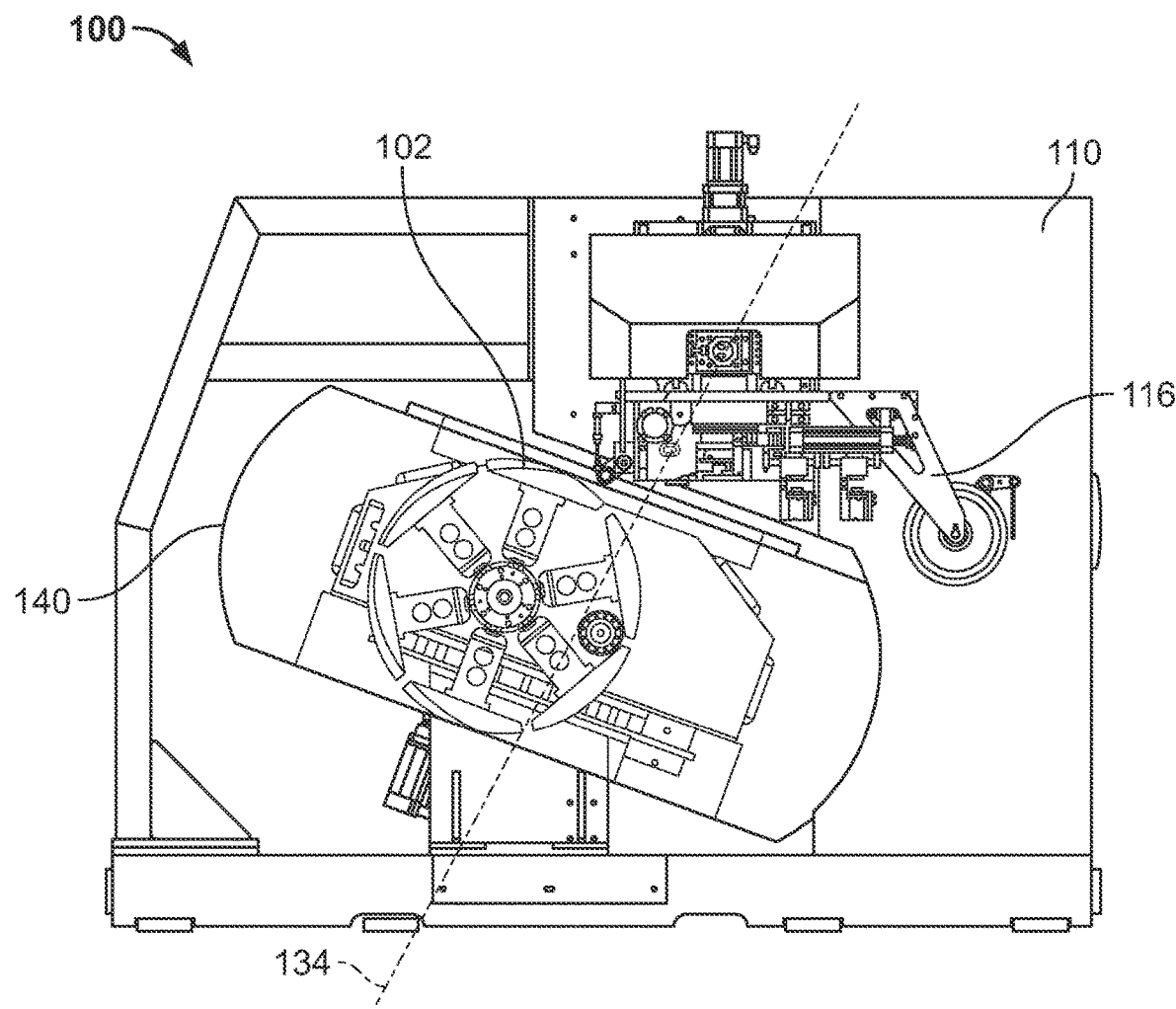
FIG. 7 is an illustration showing a side view of a portion of the bead forming system of FIG. 1 along with a movement pathway of a bead former, which indicates space that is traveled through by a former during rotation of a base plate in accordance with certain aspects of the present disclosure.

The base 118 may also be rotatable (e.g., through attachment to a rotatable base plate 138 as discussed in more detail below). For example, the base 118 may be rotatable about a base axis 134 (shown in FIG. 7). Such rotation may be utilized for moving the first bead former 102 and/or the second bead former 104 between operational and setup positions, as discussed above. As shown in FIG. 6 and FIG. 7, the base axis 134 may be perpendicular to the bead former axis 132. Notably, the base axis 134 may be angled relative to the true vertical (where "true horizontal" is defined as a plane parallel to flat ground and determined by the gravity of Earth, and where "true vertical" is defined as a direction perpendicular to "true horizontal"). For example, the base axis 134 may be angled at least 5 degrees, such as at least 15 degrees, such as at least 30 degrees (or more) relative to true vertical. Such an angle ensure that contact is not made between the bead formers and winding equipment during bead former movement. That is, referring to FIG. 7 (which shows space 140 that may be occupied during the rotation of a former), the pathway of the first bead former 102 does not interfere with any bead winding equipment 116 or other components. Such a feature is advantageous relative to certain other embodiments since the bead winding equipment 116 can remain fixed in place during movement of the bead formers rather than being moved out of the way, which may further enhance the efficiency of the bead forming system 100 by further reducing downtime.

Figure 8:
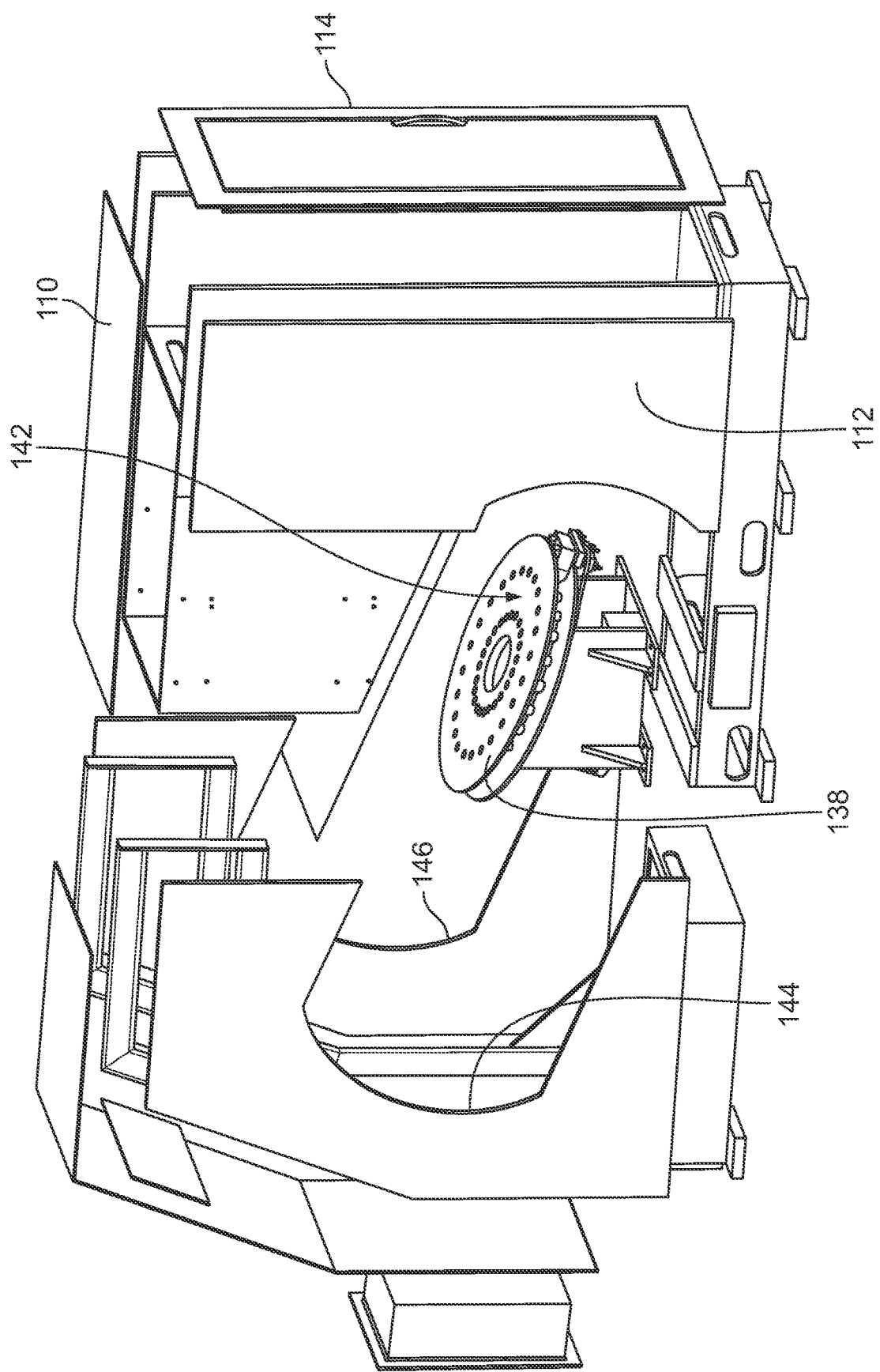
FIG. 8 is an illustration showing an exploded view of a housing for a bead forming system in accordance with certain aspects of the present disclosure.

FIG. 8 shows an exploded view of the housing 110 of the bead forming system 100 along with the base plate 138. The base plate 138, which may be rotatable relative to the depicted housing components, may include a top surface 142 that fixes to the base 118 (discussed above). The top surface 142 may be substantially planar, and it may remain in a plane as it rotates. Thus, axis of rotation of the base plate 138 (which may define the base axis, discussed above) may be perpendicular to the top surface of the base plate 138. Such an arrangement may be advantageous for providing a predictable and stable rotation of the base plate 138 (and therefore the base 118 and associated bead formers, discussed above).

While not shown in the figures, the base plate 138 and/or another component coupled to the base 118 (FIG. 1) may be driven via an actuator, such as a pneumatic or hydraulic actuator, and electric motor, etc. When an actuator is included, it may be fixed to the housing, for example.

Alternatively, it is contemplated that the base plate 138 may be rotatable manually by a human operator. In such embodiments, the base plate 138 preferably includes a locking device such that it can be fixed from rotation relative to the housing at least when a bead is being formed.

FIG. 8 also illustrates that the housing 110 may have various openings, where appropriate. For example, a first housing opening 144 may be located on the first side 112 of the housing 110 and a second housing opening 146 may be located on the second side of the housing 110. Thus, the first housing opening may accommodate a bead former when the bead former is in the first position 106 of FIG. 2, and the second housing opening 146 may accommodate a bead former when it is in the respective second position 108. While only two openings are included, additional openings are also contemplated (e.g., where three or more bead formers are attached to a base, and/or where there are multiple setup stations, for example).

Figure 9:
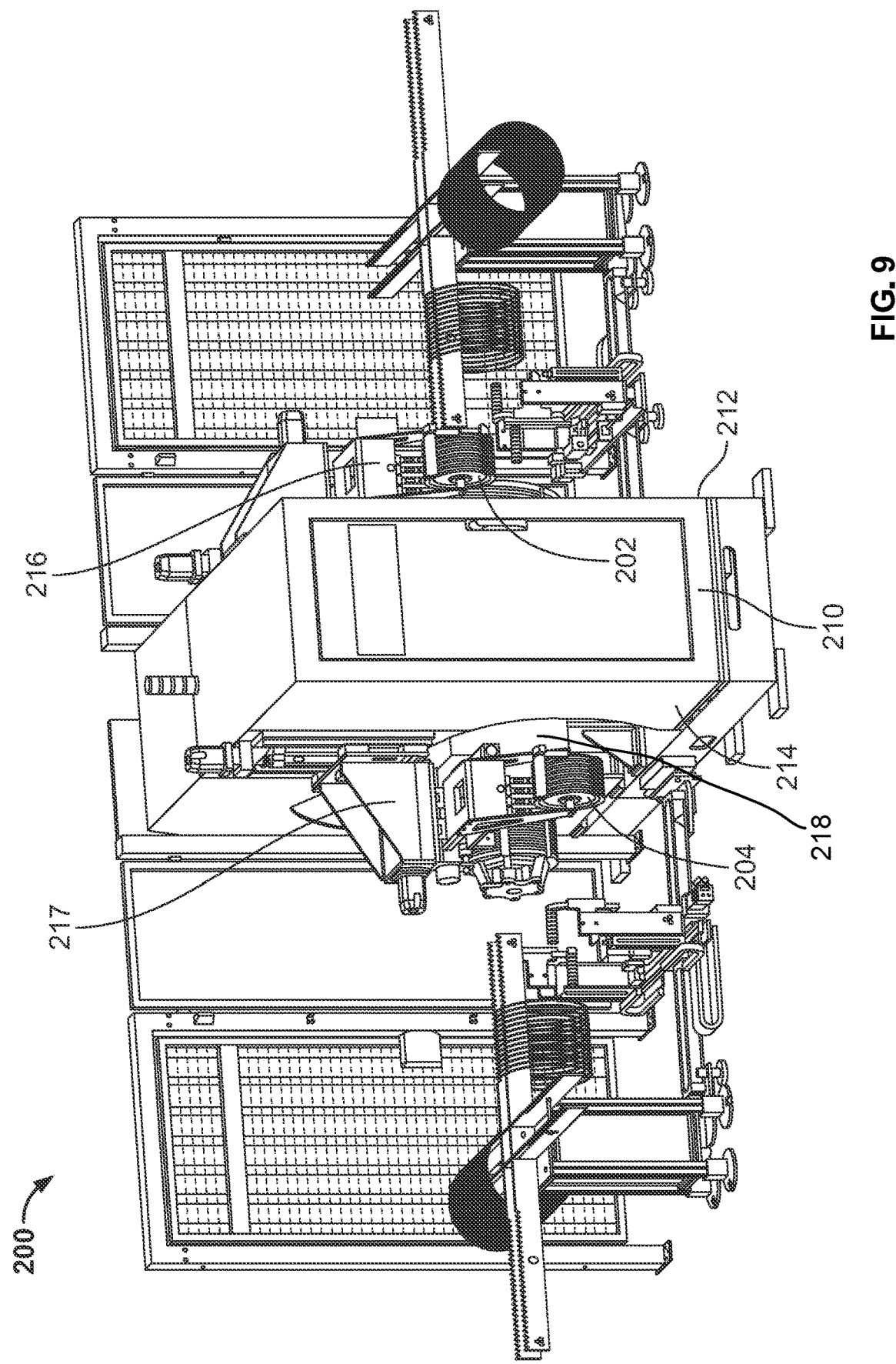
FIG. 9 is an illustration showing another embodiment of a bead forming system having multiple manufacturing areas in accordance with certain aspects of the present disclosure.

FIG. 9 shows an alternative embodiment of a bead forming system 200. In FIG. 9, two manufacturing stages are included. For example, a set of bead winding equipment 216 may be located on the first side of a housing 210 and a set of apex application equipment 217 (which appears similar to the equipment 216, though it may be substantially different in practice) may be located on a first side 212 of the housing 210. A base (similar or identical to the base 118 discussed above) may be included for switching positions of a first bead former 202 and a second bead former 204 in a manner consistent with the embodiments above (and variations thereof). Advantageously, multiple steps of the tire forming process may be accomplished without manual intervention. While only two stages are depicted in this example, it is contemplated that three or more formers may be coupled to the base 218 and thus three or more manufacturing stages (and/or setup stages) may be included. When two formers are included, a common drive shaft may rotate these formers (but this feature is optional, and separate actuators may be desirable).

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

Without limitation, the subject matter of this disclosure may also relate to one or more of the following aspects (and combinations thereof):

In a first aspect, a bead forming system for forming a tire bead may include the following: a housing, a first bead former configured to facilitate the formation of the tire bead, and a base secured to the first bead former, where the first bead former includes a bead-receiving surface that is rotatable relative to the base. The base may be adjustable such that the first bead former is movable from a first position to a second position. The first position may be on a first side of the housing, and the second position may be on a second side of the housing. A second bead former may be located in the second position when the first bead former is located in the first position, where the second bead former is located in the first position when the first bead former is located in the second position.

The bead former may engage one or more bead winding machinery components when the first bead former is in the first position. The first bead former is located in a setup area when the first bead former is located in the second position. The setup area may include at least one robotic component configured for changing the first bead former between a first bead setting and a second bead setting.

The bead-receiving surface may circumnavigate a bead former axis, where the first bead former is rotatable about the first bead former axis relative to the base. The base may be rotatable about a base axis, and the base axis may be perpendicular to the first bead former axis. The base axis may be angled relative to the true vertical.

The base may be fixed to a surface of a base plate, where the surface of the base plate is rotatable to move the first bead former between the first position and the second position. The surface of the base plate may remain in a plane when the base plate rotates, where the plane is angled relative to the true horizontal. The rotation of the base plate may be controlled via at least one actuator that is fixed to the housing.

The housing may include a first opening and a second opening, the first opening being on the first side of the housing and accommodating the bead when the first bead former is in the first position, and the second opening being on the second side of the housing and accommodating the bead when the first bead former is in the second position.

The base may include a first actuator for rotating the first bead former about a bead former axis, and where the base includes a second actuator for controlling a radial position of the bead-receiving surface of the bead.

In a second aspect, a bead forming system for forming a tire bead may include the following: a bead former configured to facilitate the formation of the tire bead, and a base secured to the bead former, where the bead former includes a bead-receiving surface that is rotatable relative to the base about a first axis. The base may be rotatable about a second axis such that the bead former is movable from a first position to a second position.

The first axis may be perpendicular to the second axis.

The second axis may be angled relative to the true vertical.

The first position may be on a first side of a housing and corresponds with a first housing opening, and the second position may be on a second side of the housing and corresponds with a second housing opening.

The bead former may engage one or more bead winding machinery components when the bead former is in the first position.

The bead former may be located in a setup area when the bead former is located in the second position.

In a third aspect, a bead forming system for forming a tire bead may include one or more of the following: a housing having a first side and a second side, and a base coupled to a first former and a second former. The first former may be on the first side of the housing, and the second former may be on the second side of the housing. The base may be rotatable such that the first former is movable to the second side of the housing and the first former is movable to the second side of the housing.

In addition to the features mentioned in each of the independent aspects enumerated above, some examples may show, alone or in combination, the optional features mentioned in the dependent aspects and/or as disclosed in the description above and shown in the figures.

I claim:

1. A bead forming system for forming a tire bead, the bead forming system comprising:
   a housing;
   a first bead former configured to facilitate the formation of the tire bead; and
   a base secured to the first bead former, wherein the first bead former includes a bead-receiving surface that is rotatable relative to the base, wherein the base is adjustable such that the first bead former is movable from a first position to a second position, wherein the first position is on a first side of the housing, wherein the second position is on a second side of the housing, and wherein the housing includes a first opening and a second opening, the first opening being on the first side of the housing and accommodating the first bead former when the first bead former is in the first position, and the second opening being on the second side of the housing and accommodating the first bead former when the first bead former is in the second position.

2. The first bead former of claim 1, wherein a second bead former is located in the second position when the first bead former is located in the first position, and wherein the first bead former comprises a first diameter and the second bead former comprises a second diameter, which is different from the first diameter.

3. The bead forming system of claim 1, wherein the first bead former engages one or more bead winding machinery components when the first bead former is in the first position.

4. The bead forming system of claim 3, wherein the first bead former is located in a setup area when the first bead former is located in the second position.

5. The bead forming system of claim 4, wherein the setup area includes at least one robotic component configured for changing the first bead former between a first bead setting and a second bead setting.

6. The first bead former of claim 1, wherein the bead receiving surface circumnavigates a bead former axis, and wherein the first bead former is rotatable about the first bead former axis relative to the base.

7. The first bead former of claim 6, wherein the base is rotatable about a base axis, the base axis being perpendicular to the first bead former axis.

8. The first bead former of claim 7, wherein the base axis is angled relative to the true vertical.

9. The first bead former of claim 1, wherein the base is fixed to a surface of a base plate, and wherein the surface of the base plate is rotatable to move the first bead former between the first position and the second position.

10. The first bead former of claim 9, wherein the surface of the base plate remains in a plane when the base plate rotates, and wherein the plane is angled relative to the true horizontal.

11. The first bead former of claim 9, wherein the rotation of the base plate is controlled via at least one actuator that is fixed to the housing.

12. The first bead former of claim 1, wherein the base includes a first actuator for rotating the first bead former about a bead former axis, and wherein the base includes a second actuator for controlling a radial position of the bead-receiving surface of the bead.

13. A bead forming system for forming a tire bead, the bead forming system comprising:

a bead former configured to facilitate the formation of the tire bead via bead winding machinery components; and a base secured to the bead former, wherein the bead former includes a bead-receiving surface that is rotatable relative to the base about a first axis, wherein the base is rotatable about a second axis such that the bead former is movable from a first position to a second position; wherein the second axis is angled by at least 5 degrees relative to a true vertical; and wherein based at least in part on the second axis being angled, when the bead former moves between the first position and the second position, the bead former traverses through a lower intermediate position, which is between the first position and the second position and is lower than the bead winding machinery components, and a higher intermediate position, which is between the first position and the second position and is at least level with the bead winding machinery components.

14. The bead former of claim 13, wherein the first axis is perpendicular to the second axis.

15. The bead former of claim 13, wherein the first position is on a first side of a housing and corresponds with a first housing opening, and wherein the second position is on a second side of the housing and corresponds with a second housing opening.

16. The bead forming system of claim 13, wherein the bead former engages one or more bead winding machinery components when the bead former is in the first position.

17. The bead forming system of claim 16, wherein the bead former is located in a setup area when the bead former is located in the second position.

* * * * *